3,706,752
MANUFACTURE OF BIPYRIDYLIUM SALTS BY OXIDATION OF THE CORRESPONDING DIHYDROBIPYRIDYL
John Francis Cairns, Runcorn, England, assignor to Imperial Chemical Industries Limited, London, England
No Drawing. Filed Mar. 21, 1969, Ser. No. 809,402
Claims priority, application Great Britain, Apr. 2, 1968, 15,785/68
Int. Cl. C07d 31/42
U.S. Cl. 260—296 D          1 Claim

ABSTRACT OF THE DISCLOSURE 1,1-disubstituted-bipyridylium salts are prepared by oxidizing the corresponding dihydrobipyridyl with oxygen or oxidizing agent which is an electron acceptor and which has a redox potential in water more positive than −0.50 volt as compared with the saturated calomel electrode.

---

This invention relates to the manufacture of bipyridylium salts and related compounds and particularly to a process for the manufacture of 1,1'-disubstituted bipyridylium salts which are useful herbicides.

According to the present invention we provide a process for the manufacture of 1,1'-disubstituted bipyridylium salts which comprises treating the corresponding 1,1'-disubstituted-1,1'-dihydrobipyridyl with oxygen or an oxidizing agent which is an electron acceptor and which has a redox potential in water more positive than −0.50 volt as compared with the saturated calomel electrode.

The reaction may conveniently be carried out in the presence of a solvent for the dihydrobipyridyl. Examples of suitable solvents are carbon disulphide; ethers and thioethers for example diethyl ether, tetrahydrofuran, 1:2-dimethoxyethane, bis-(2-methoxyethyl) ether, 1:4-dioxanea and thiophene; ketones, for example acetone; hydrocarbons, for example benzene, toluene, xylene and hexane; organic bases, for example pyridine; halogenated hydrocarbons and particularly chlorinated hydrocarbons, for example chlorobenzene, chloroform, and methylene dichloride; amides, particularly tertiary alkylamides, for example dimethyl formamide; sulphoxides, for example dimethyl sulphoxide; sulphones, for example sulpholane; and nitriles, for example acetonitrile. Mixtures of solvents may be used, if desired. We prefer to use a solvent or mixture of solvents which is immiscible with water since this assists recovery of the product by phase-separation.

The concentration of the dihydrobipyridyl may be conveniently from 0.05 to 0.15 mole per litre and the concentration of the oxidising agent may be from 0.1 to 10 gms. per 100 mls. of the reaction mixture. If the reagents are used in high concentration care should be taken that the reaction does not become too vigorous and lead to some destruction of the desired product or to the production of unwanted by-products.

The temperature at which the reaction is carried out will depend upon the concentration of the reagents and on the particular reagents and solvent used. We have found that suitable temperatures are from −50° C. to 200° C., preferably from 0° C. to 150° C.; room temperature can be used. The most suitable time of reaction can be found by simple experiment and depends upon the reagents used and the temperature at which the reaction is carried out; we have however found that a minimum time of 20 to 30 minutes is generally necessary in order to obtain optimum yields. At temperatures below ambient temperatures long periods, for example 2 days, may be required in order to obtain optimum yields.

Any isomeric dihydrobipyridyl can be converted to the corresponding bipyridylium salt by the process of the invention, irrespective of its method of manufacture. Examples of suitable dihydrobipyridyls are those having alkyl or carbamidoalkyl substituents, and especially methyl, ethyl or carbamidomethyl substituents on the nitrogen atoms of the pyridyl nuclei; such dihydro-4,4'-(or -2,2'-)bipyridyls are described and claimed in our co-pending patent application No. 15,785/68.

The dihydrobipyridyl for use in the present invention can be prepared by reacting the corresponding tetrahydrobipyridyl with sulphur as described in our co-pending application No. 15,785/68; with a transition metal salt as described in our co-pending application No. 16,474/68; with a dehydrogenation catalyst which is a metal or an oxide thereof as described in our co-pending application No. 17,893/68; or with an organic disulphide containing at least one —S—S— linkage as described in our co-pending application No. 47,586/68. Since dihydrobipyridyls are readily oxidised to bipyridylium salts, for example using air or oxygen, they are normally prepared and stored under an inert atmosphere for example an atmosphere of nitrogen. Moreover they are not usually isolated for conversion to the bipyridylium salts from the reaction mixture in which they have been prepared.

Any oxidising agent can be used which has the specified redox potential and which is an electron acceptor and examples of suitable inorganic oxidising agents are ceric disulphate, preferably in an acidic medium; metal salts, especially halide salts; the inorganic oxyacid anhydrides, especially sulphur dioxide and sulphur trioxide; and air or oxygen in conjunction with water, carbon dioxide and/or acetic acid. Air or oxygen itself may be used to effect the oxidation. Organic oxidising agents, for example quinones such as benzoquinone, chloroanil and anthraquinone may also be used, as may mixtures of oxidising agents.

The 1,1'-disubstituted bipyridylium salts can be recovered from the reaction mixture by conventional processes, for example by extraction of the mixture with water or with a dilute solution of an acid such as sulphuric, hydrochloric, phosphoric or acetic acid. The aqueous phase is then separated from the organic phase and the bipyridylium salt is recovered from the aqueous phase by evaporation of the water and crystallisation of the salt.

The invention is illustrated but in no way limited by the following examples.

EXAMPLE 1

A solution of ceric disulphate (7 gms.) in 1 N sulphuric acid (125 mls.) was added with stirring at 25° C. to a solution of 1,1'-dimethyl-1,1'-dihydro-4,4'-bipyridyl (0.02 mole) in toluene (50 mls.) under an atmosphere of nitrogen.

The aqueous phase was separated from the resulting mixture and was found spectrophotometric analysis to contain the 1,1'-dimethyl-4,4'-bipyridylium cation in an amount representing a reaction efficiency of about 100% with respect to the dihydrobipyridyl fed.

EXAMPLE 2

A solution of 1,1'-dimethyl-1,1'-dihydro-4,4'-bipyridyl (0.02 mole) in toluene (50 mls.) was added under an atmosphere of nitrogen to a stirred solution of sulphur dioxide gas (0.04 mole) in acetonitrile (50 mls.). A precipitate was obtained and this was dissolved in water to yield a solution which was found by spectrophotometric analysis to contain the 1,1'-dimethyl-4,4'-bipyridylium cation. The reaction efficiency in respect of this cation was about 100% based on the dihydrobipyridyl fed.

EXAMPLE 3

Dilute (5%) aqueous acetic acid solution (50 mls.) was added to a solution of 1,1'-dimethyl-1,1'-dihydro-4,4'- bipyridyl (0.02 mole) in toluene at 25° C. with stirring under an atmosphere of nitrogen. Air was then blown through the mixture at a rate of 50 litres/hour for 10 minutes. The resulting solution was found by spectrophotometric analysis to contain the 1,1'-dimethyl-4,4'-bipyridylium cation in an amount representing a reaction efficiency of 100% based on the dihydrobipyridyl fed.

EXAMPLE 4

A small amount of water (ca. 10 mls.) was added to a solution of 1,1'-dimethyl-1,1'-dihydro-4,4'-bipyridyl (0.02 mole) in toluene (50 mls.) under an atmosphere of nitrogen, and a mixture of air and carbon dioxide (v./v. ratio 1) was blown through the solution at a rate of 50 ml./hour for 10 minutes. The product was the 1,1'-dimethyl-4,4'-bipyridylium cation and the reaction efficiency was 100% based on the dihydrobipyridyl fed.

EXAMPLE 5

A solution of 2 parts by weight of benzoquinone in diglyme (50 mls.) was added to a solution of 1 part by weight of 1,1'-dimethyl-1,1'-dihydro-4,4'-bipyridyl in toluene (50 mls.) under an atmosphere of nitrogen. Aqueous sulphuric acid (2 N) was added to the mixture until the mixture just became acidic and the resulting aqueous layer was separated from the organic solvent layer. Spectrophotometric analysis of the aqueous phase showed the presence of 1,1'-dimethyl-4,4'-bipyridylium cation in an amount representing a reaction efficiency of 70% based on dihydrobipyridyl fed.

EXAMPLE 6

A solution of 2 parts by weight of chloranil in dimethyl formamide (50 mls.) was added to a solution of 1 part by weight of 1,1'-dimethyl-1,1'-dihydro-4,4'-bipyridyl in toluene (50 mls.) under an atmosphere of nitrogen. The resulting precipitate was filtered off and treated with aqueous sulphuric acid (2 N—) until the mixture just became acidic. A precipitate comprising the reduced chloranil was removed by filtration and the resulting solution was analysed. The reaction efficiency was 85% in respect of 1,1'-dimethyl-4,4'-bipyridylium cation produced, based on dihydrobipyridyl fed.

EXAMPLE 7

1,1'-dimethyl-1,1',4,4'-tetrahydro - 4,4' - bipyridyl was prepared by reacting 60 mls. of a solution of methyl pyridinium chloride in water (2.754 moles/l.) with 100 mls. of sodium amalgam (0.4% w./w.) under an atmosphere of nitrogen. The product was dissolved in 200 mls. of petrol (B.P. 60–80° C.).

2 mls. of this solution of the tetrahydrobipyridyl were added dropwise over a period of 15 minutes to 50 mls. of carbon disulphide containing 3.0 gms. of flowers of sulphur maintained under an atmosphere of nitrogen. The mixture was stirred for 2 days at ambient temperature and then the temperature was raised to 46° C. for 3 hours. The mixture was then cooled and poured into dilute hydrochloric acid (150 mls.) under nitrogen. Air was blown through the mixture which was then filtered to remove sulphur. Colorimetric analysis of the solution indicated 104 mgms. of 1,1'-dimethyl-4,4'-bipyridylium dichloride, representing an efficiency of 49% based on the methyl pyridinium chloride starting material.

EXAMPLE 8

A solution of sulphur (0.66 gms.) in thiophene (25 mls.) was added dropwise over a period of 15 minutes to 5 mls. of a solution in petrol of 1,1'-dimethyl-1,1',4,4'-tetrahydro-4,4'-bipyridyl prepared as in Example 7 and under an atmosphere of nitrogen. The mixture was stirred for 18 hours at ambient temperature and was then poured into dilute hydrochloric acid (150 mls.) under nitrogen. Air was blown through the mixture which was then filtered to remove sulphur. Colorimetric analysis indicated 250 mgms. of 1,1'-dimethyl-4,4'-bipyridylium dichloride, representing an efficiency of 47% based on the methyl pyridinium chloride starting material.

EXAMPLE 9

25 mls. of a saturated solution of sulphur in pyridine were added dropwise over a period of 15 minutes to a mixture of 10 mls. of pyridine and 10 mls. of a solution of 1,1'-dimethyl-1,1',4,4'-tetrahydro-4,4'-bipyridyl in toluene (prepared as in Example 7 but using toluene instead of petrol to dissolve the product) under an atmosphere of nitrogen. The mixture was stirred at ambient temperature for 2 hours, then poured into dilute hydrochloric acid (150 mls.) under nitrogen. Air was blown through the mixture which was then filtered to remove sulphur. Colorimetric analysis of the final solution indicated a yield of 414 mgms. of 1,1'-dimethyl-4,4'-bipyridylium dichloride, representing an efficiency of 39% based on the methyl pyridinium chloride starting material.

EXAMPLE 10

Ethylene-bis-pyridinium bromide (2.1271 gms. in 10 mls. water) was added dropwise over a period of about 30 minutes to a stirred mixture of sodium amalgam (10 mls. containing 0.45% sodium) and cyclohexane (60 mls.) under an atmosphere of nitrogen. The resulting solution of 1,1'-ethylene-1,1',2,2'-tetrahydro-2,2'-bipyridyl was filtered and to it was added carbon disulphide (20 mls.) containing sulphur (2.5 gms.).

The mixture was stirred at 46° C. for 18 hours after which time it was cooled to ambient temperature and poured into dilute acetic acid (150 mls.) under nitrogen. Air was blown through the mixture after which it was filtered to remove sulphur. Spectroscopic (ultra-violet) analysis of the final solution indicated a yield of 206 mgms. of 1,1'-ethylene-2,2'-bipyridylium ion, representing an efficiency of 18% based on the ethylene-bis-pyridinium bromide starting material.

EXAMPLE 11

A solution of 1,1'-ethylene-1,1',2,2'-tetrahydro-2,2'-bipyridyl in toluene was prepared by the procedure of Example 10 but using toluene instead of cyclohexane as solvent. A portion (10 mls.) of this solution was added to 20 ml. of a saturated solution of sulphur in xylene, and stirred at 20° C. under an atmosphere of nitrogen for 18 hours. The solution was then poured into dilute hydrochloric acid (50 mls.) and air was blown through the mixture. The mixture was filtered to remove sulphur. Spectroscopic (ultra-violet) analysis of the final aqueous solution indicated a yield of 40 mgms. of 1,1'-ethylene-2,2'-bipyridylium dichloride, representing an efficiency of 23% based on the ethylene bis-pyridinium bromide starting material.

What I claim is:

1. A process for the manufacture of 1,1'-disubstituted bipyridylium salt which consists essentially of treating 1,1'-dimethyl-1,1'-dihydro-4,4'-bipyridyl in toluene at about 25° C. with a sulphuric acid containing solution of ceric disulphate, said reaction being carried out under an atmosphere of nitrogen, the anion being derived from the acid.

References Cited

UNITED STATES PATENTS 3,405,135  10/1968  Colchester et al. ---- 260—296 D

ALAN L. ROTMAN, Primary Examiner

U.S. Cl. X.R.

260—250 R, 295 AM

UNITED STATES PATENT OFFICE
CERTIFICATE OF CORRECTION

Patent No. 3,706,752　　　　　　Dated December 19, 1972

Inventor(s) JOHN FRANCIS CAIRNS

It is certified that error appears in the above-identified patent and that said Letters Patent are hereby corrected as shown below:

In the heading of the Patent, under the paragraph "Claims priority", please correct to read as follows:

--application Great Britain, Apr. 2, 1968, 15,785/68 and application Great Britain, Dec. 23, 1968, 61,011/68--

Signed and sealed this 20th day of August 1974.

(SEAL)
Attest:

McCOY M. GIBSON, JR.
Attesting Officer

C. MARSHALL DANN
Commissioner of Patents